Patented Nov. 17, 1953

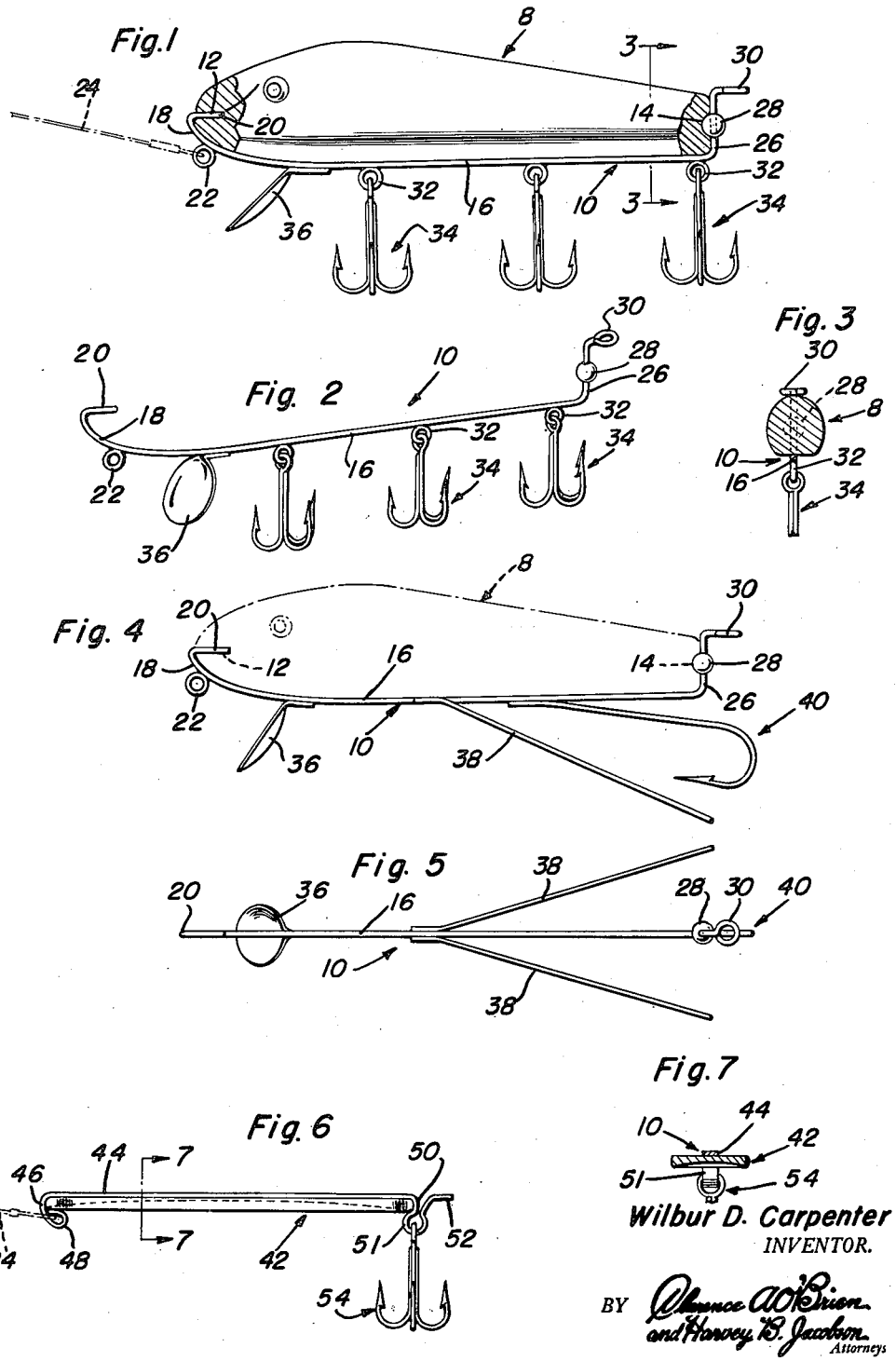

2,659,175

UNITED STATES PATENT OFFICE 2,659,175

VARIABLE MULTIPURPOSE LURE

Wilbur D. Carpenter, Coffeyville, Kans.

Application April 5, 1951, Serial No. 219,397

2 Claims. (Cl. 43—42.09)

1

The present invention relates to certain new and useful improvements in interchangeable lure constructions and has more particular reference to a multipurpose lure with variable structural and functional characteristics.

As the preceding statement implies, variable lure constructions are not broadly new. Lures in this category are characterized, generally speaking, by readily applicable and removable attachment means equipped with complemental accessories, such as hooks, and the like, and a plurality of selectively usable lures, such as differently shaped and colored plugs, spoons, and the like.

The present invention has to do with the combination of a lure of chosen type and novel attachment means, the latter being in the nature of a resilient adapter unit which constitutes a carrier for the various accessories and which has novel ways and means whereby it may be readily snapped in place for proper coaction with the accompanying lure.

In carrying out the principles of the invention, two or more embodiments are employed in contriving the so-called attachment-type adapters. One is for wooden and equivalent plugs. This style has to do with a resilient member, generally of elongated construction, which underlies the central area of the ventral portion of the plug, where it is provided with hooks and the like, novel means being provided at opposite ends for separable but reliable connection with corresponding ends of the plug.

A further embodiment is utilized in the provision of a simple and practical adapter which is separably mounted on opposite end portions of a suitable spoon and this, too, in its preferred form, is an elongated resilient member having snap fasteners at opposite ends.

Other objects and advantages of the invention will become more readily apparent from the following description and the accompanying sheet of illustrative drawings.

In the accompanying drawings, wherein like numerals are employed to designate like parts throughout the views:

Figure 1 is a side elevational view showing an example plug, the adapter-type attachment and the manner in which same is specifically constructed and utilized.

Figure 2 is a perspective view of the adapter means or unit per se, showing several fishhooks and a wobble-type baffle.

Figure 3 is a cross-section on the vertical line 3—3 of Figure 1, looking in the direction of the arrows.

2

Figure 4 is a view based on Figure 1, showing the plug in dotted lines, and illustrating the adapter unit equipped with differently constructed accessories.

Figure 5 is a top plan view of Figure 4 with the plug omitted.

Figure 6 is a side or edge elevational view showing a lure in the form of a spoon and showing a modified adapter unit applied thereto.

Figure 7 is a cross-section on the vertical line 7—7 of Figure 6, looking in the direction of the arrows.

By way of introduction to the detailed description and briefly summarized, the invention herein comprehended has to do with a suitable plug having an axial keeper socket in its leading end and an axially disposed recess at its trailing end constituting a keeper seat, an adapter unit in the form of an elongated resilient member of small cross-section from end to end and having its leading end laterally curved and provided with a rearward bend providing a terminal releasably fitting in said keeper socket, the trailing end of said member having a lateral bend and contacting the trailing end of said plug and being provided with a fixed bead, said lateral bend being resilient and having a rearwardly directed lateral terminal eye providing a finger-piece, and complemental accessories attached to and suspended from said adapter unit.

For convenience of description, attention is first directed to Figures 1 to 3, inclusive. As shown in Figure 1, the numeral 8 denotes a suitable wooden or equivalent plug. In practice any number of plugs of different shapes and colors will, as is evident, be employed. This will enable the fisherman to purchase a plurality and variety of plugs and will make it possible to utilize any one of these plugs in conjunction with the line attaching and accessory carrier means which, in the instant matter, takes the form of unique adapter means, also herein referred to as the adapter unit 10 (see Fig. 2). Of course, all of the plugs will be of standard dimensions in order to accommodate the adapter means 10. For example, the nose or leading end of the plug has an axial centralized socket 12 therein which constitutes a keeper socket. The rear or trailing end has an axial recess or indentation 14 which, for sake of distinction, will be called a keeper seat. Other than these factors, colors and shapes of the plugs will vary, as is clear.

With reference to the adapter means or unit 10, this is preferably an elongated piece of resilient wire 16 of suitable gauge. The forward end is curved and bent, as at 18, and has a lateral, rearwardly projecting terminal or bend 20 which constitutes a keeper and which is adapted to snap into the keeper socket 12. At this same end, there is a fixed line eye 22 to which the fishing line 24 is permanently attached. By reason of this construction, it is not necessary to have to continually attach and detach the line, as is necessary in some constructions. The opposite or rear end of the wire member is bent at right angles, as at 26, and the lateral bend thus had is provided intermediate its ends with a fixed bead 28 which is adapted to resiliently snap into the keeper seat 14. The terminal of the wire is rearwardly and laterally bent and is fashioned into an eye 30 which may be used as a finger-piece or may be used as ways and means for attachment of bait such, for example, as a piece of pork rind. The longitudinally spaced rings 32 constitute satisfactory ways and means for suspending and attaching the multiple prong fishhooks 34. The numeral 36 denotes an appropriate concavo-convex plate which is a baffle and is sometimes referred to as a wobble-type baffle.

It will be obvious that the keeper 20 snaps removably into the keeper socket 12 and that the main wire or resilient member 16 underlies the belly of the body and that the lateral end 26 coacts with the rear end of the body with the ball detent 28 fitting removably into the keeper seat 14.

Referring now to the disclosure in Figures 4 and 5, the parts already described are denoted by the same reference numerals; that is to say, the lure or plug is denoted by the numeral 8 and the attachment type adapter means or unit is denoted by the numeral 10, and so on. The difference here is that the adapter unit is provided with a pair of downwardly inclined, rearwardly diverging flexible weed guards 38 and a single fishhook 40 is rigidly secured to the resilient member 16 rearwardly of the weed guard in the manner shown. It is to be stated at this point that the expression "accessories" is used to generically cover the multiple prong fishhooks 34, the baffles 36, the weed guards 38 and single prong fishhook 40. Obviously, the adapter unit constitutes a common or single carrier for these coacting accessories.

The lure in Figures 6 and 7 takes the form of a spoon and is denoted by the numeral 42. This may be of any suitable construction. Thus, the expression "lure" is intended to comprehend either a plug or a spoon, regardless of the specific design or construction of the latter. Here, again, the adapter unit is denoted, as an entity, by the numeral 10. More explicitly, however, this form of adapter unit is a flat resilient metal band or strip 44 as best shown in Figure 7. The forward end is fashioned into a laterally bent snap fastener or hook 46 terminating in an eye 48 which functions not only as a detent but as attachment means for the line 24. This snap fastener engages over the forward end of the spoon. Similar bends 50 and 51 provide an eye which latter is also a lateral snap fastener, and said eye functions as a bait hanger and also as a finger grip 52. Here, the weed guards are denoted by the numerals 38 and the fishhook by the numeral 40. These are the same elements seen in Figures 4 and 5. Finally, a fishhook 54 may, if desired, be hung in and from said eye 51.

The gist of the invention is in the attachment or adapter unit 10 which is a resilient member and which has fastener means at opposite ends, preferably fastener means having inherent resilient properties to assist in applying, removing and holding the unit 10 in place. The main or body portion of the unit is provided with accessories of the kinds shown. It is evident, therefore, that a user with a single attachment adapter may employ various types of plugs and spoons with the one adapter unit and thus be in a position to make up a lure for any given fishing occasion.

In view of the foregoing description taken in conjunction with the accompanying drawings, it is believed that a clear understanding of the device will be quite apparent to those skilled in this art. A more detailed description is accordingly deemed unnecessary.

Minor changes in shape, size, materials and arrangement of parts may be resorted to in actual practice without departing from the spirit and scope of the invention as claimed.

Having described the invention, what is claimed as new is:

1. In combination, a fishing plug having an axial keeper socket in its leading end and an axially disposed recess in its trailing end constituting a keeper seat, an adapter unit in the form of an elongated resilient member of small cross-section from end to end and having its leading end laterally curved and provided with a rearward bend providing a terminal releasably fitting in said keeper socket, the trailing end of said member having a lateral bend contacting the trailing end of said plug and being provided with a fixed bead, said lateral bend being resilient and having a rearwardly directed lateral terminal eye providing a finger-piece, and complemental accessories attached to and suspended from said adapter unit.

2. In combination, a fishing plug having an axial socket in its leading end constituting a keeper socket and having an axially disposed recess in its trailing end constituting a keeper seat, an adapter unit in the form of an elongated resilient member of small cross-section from end to end and having its leading end laterally curved and provided with a rearward bend providing a terminal releasably fitting in said keeper socket, the trailing end of said member having a lateral bend contacting the trailing end of said plug and provided with a fixed bead, said lateral bend being resilient and having a rearwardly directed lateral terminal eye providing a finger-piece, and complemental accessories attached to and suspended from said adapter unit, said accessories including a fish hook and rearwardly diverging flexible weed guards cooperating with said fish hook.

WILBUR D. CARPENTER.

References Cited in the file of this patent
UNITED STATES PATENTS

| Number | Name | Date |
|---|---|---|
| 765,482 | Hardy | July 19, 1904 |
| 1,807,283 | Dick | May 26, 1931 |
| 2,204,552 | Singleton | June 18, 1940 |
| 2,228,591 | Brown | Jan. 14, 1941 |
| 2,295,292 | Rogers | Sept. 8, 1942 |
| 2,573,399 | Cannon | Oct. 30, 1951 |
| 2,593,220 | Thompson et al. | Apr. 15, 1952 |